United States Patent [19]

Yamada et al.

[11] Patent Number: 5,333,554
[45] Date of Patent: Aug. 2, 1994

[54] VEHICLE AND METHOD OF PRODUCING THE SAME

[75] Inventors: Toshihisa Yamada; Toshiharu Miyamoto; Kazuo Hayashi, all of Kudamatsu; Ryoichi Takayama, Yamaguchi; Shinji Kobayashi; Keizi Ohmura, both of Kudamatsu, all of Japan

[73] Assignee: Hitachi, Ltd., Tokyo, Japan

[21] Appl. No.: 873,182

[22] Filed: Apr. 24, 1992

[30] Foreign Application Priority Data

Apr. 26, 1991 [JP] Japan .................................. 3-096749
Nov. 20, 1991 [JP] Japan .................................. 3-304519

[51] Int. Cl.⁵ ........................ B61D 17/08; B61D 17/12
[52] U.S. Cl. .................................... 105/397; 105/401; 296/197; 296/210; 296/30
[58] Field of Search ............... 105/397, 401, 404, 409; 296/197, 210, 213, 29, 30; 52/45, 56

[56] References Cited

U.S. PATENT DOCUMENTS

| | | | |
|---|---|---|---|
| 2,760,446 | 8/1956 | Watter | 105/404 X |
| 3,131,649 | 5/1964 | Eggert, Jr. | 105/401 |
| 3,827,137 | 8/1974 | Schubach | 296/210 X |

FOREIGN PATENT DOCUMENTS

| | | |
|---|---|---|
| 4995779 | 8/1978 | Australia . |
| 5000179 | 8/1978 | Australia . |
| 247184 | 7/1987 | German Democratic Rep. ........... 105/401 |
| 248247 | 8/1987 | German Democratic Rep. ........... 105/401 |
| 48-64910 | 8/1973 | Japan . |
| 55-31694 | 6/1980 | Japan . |

*Primary Examiner*—Robert J. Oberleitner
*Assistant Examiner*—S. Joseph Morano
*Attorney, Agent, or Firm*—Antonelli, Terry, Stout & Kraus

[57] ABSTRACT

A vehicle such as a railroad car is constructed by connecting together side and roof blocks, each equipped with interior components, in a manner to improve the outer appearance of the connections between the side and roof blocks. Longitudinal beams of the side blocks are in contact with the under surfaces of gutters formed by the outer plate of the roof block. The side and roof blocks, equipped with the interior components, are connected together at the gutter portions by a welding which can be conducted solely from an exterior side of the vehicle. In the interior of the vehicle, the longitudinal beams and joints secured to the side blocks are connected to lateral beams of the roof block by rivets. Thereafter, a third interior plate is provided between interior plates of the side and roof blocks. Since the connections are formed at the gutter portions, the connecting operations can easily be conducted outside the vehicle and in a manner to assure a good from an exterior of appearance.

6 Claims, 7 Drawing Sheets

VEHICLE AND METHOD OF PRODUCING THE SAME

BACKGROUND OF THE INVENTION

1. Field of the Invention

The present invention relates to the body structure of a vehicle, such as a railroad car, a vehicle running on a guideway, an astride-type monorail car, a bus, or the like.

2. Description of the Prior Art

The body of a vehicle of this type is formed as a hexahedron, which consists of a floor, a roof, walls extending in the longitudinal direction of the vehicle (referred to as "sides"), and walls extending in the widthwise direction of the vehicle (referred to as "ends").

This type of vehicle body is generally produced in the following manner. First, each of the planes constituting the hexahedron is formed as a block which consists of a framework and a board forming an outer surface. Then, these six blocks are assembled and connected together by welding, by using bolts, or the like. The connecting operation is generally conducted both inside and outside the vehicle. Subsequently, various components such as pipes, wires and interior equipment (a floor sheet, interior plates forming the walls and ceiling of the body, seats, window fittings, and lighting equipment, etc.) are put in the vehicle body through doorways and window provided in the side blocks and the end blocks, and are installed inside the vehicle. An example of such a vehicle body is shown in Japanese Patent Laid-Open Publication No. 55-31694 (corresponding to U.S. Pat. No. 4,222,335).

In the above example, mounting various interior components is conducted in the interior of the vehicle, that is, in a rather small space, resulting in poor operational efficiency. Further, the mounting operation requires a lot of time.

In view of this problem, a system has been proposed wherein six blocks are connected together after the various interior components have been attached to the inner sides of the blocks. The assembly of the blocks is conducted by using rivets, bolts and nuts, or the like. The connection of the side blocks and the roof block is substantially effected at positions around the roof, interior and exterior of the vehicle. The connection exterior the vehicle is effected by fastening outwardly protruding end portions of the side blocks to outwardly protruding end portions of the roof block by rivets or the like. These outwardly protruding end portions are protected by covers so as to prevent water leakage. The covers are made of stainless steel or the like. These outwardly protruding end portions also serve as gutters. The connection on the inner side of these portions is also effected by rivets. The construction described above is disclosed in Japanese Utility Model Laid-Open Publication No. 48-64910.

It appears that a problem with the construction shown in Japanese Utility Model Laid-Open Publication No. 48-64910 is that no consideration is given to exterior appearance or waterproofing.

SUMMARY OF THE INVENTION

It is an object of the present invention to improve the appearance of the joint sections between the side blocks and the roof block of a vehicle of the above-described type, in which the side blocks and the roof block are connected together after the interior components have been attached thereto.

In accordance with the present invention, the gutters in the upper sections of the side blocks are formed by end portions of an external plate of the roof block, and the above-mentioned end portions of the external plate, which are in or near the gutter sections, are connected to the side blocks by a connecting means which enables them to be connected to the side blocks solely by an operation conducted exteriorly of the vehicle, with an interior plate of the roof block and an interior plate of each side block being connected together through an intermediate third interior plate.

Since the connection of the side blocks and the roof block is conducted in the gutter sections provided in the upper sections of the side blocks, the connecting operation can be carried out only from the exterior of the vehicle, and after the interior finish work has been completed. The connecting operation can be easily conducted without impairing the appearance of the vehicle even though it is conducted exteriorly of the vehicle. Further, since third interior plates are attached after effecting the connection of the inner portions of the joint sections between the roof block and the side blocks, a connection is also effected on the inner side of the joint sections.

DESCRIPTION OF THE PREFERRED EMBODIMENTS

An embodiment of the present invention will now be described with reference to FIGS. 1 and 2.

Figure 2:
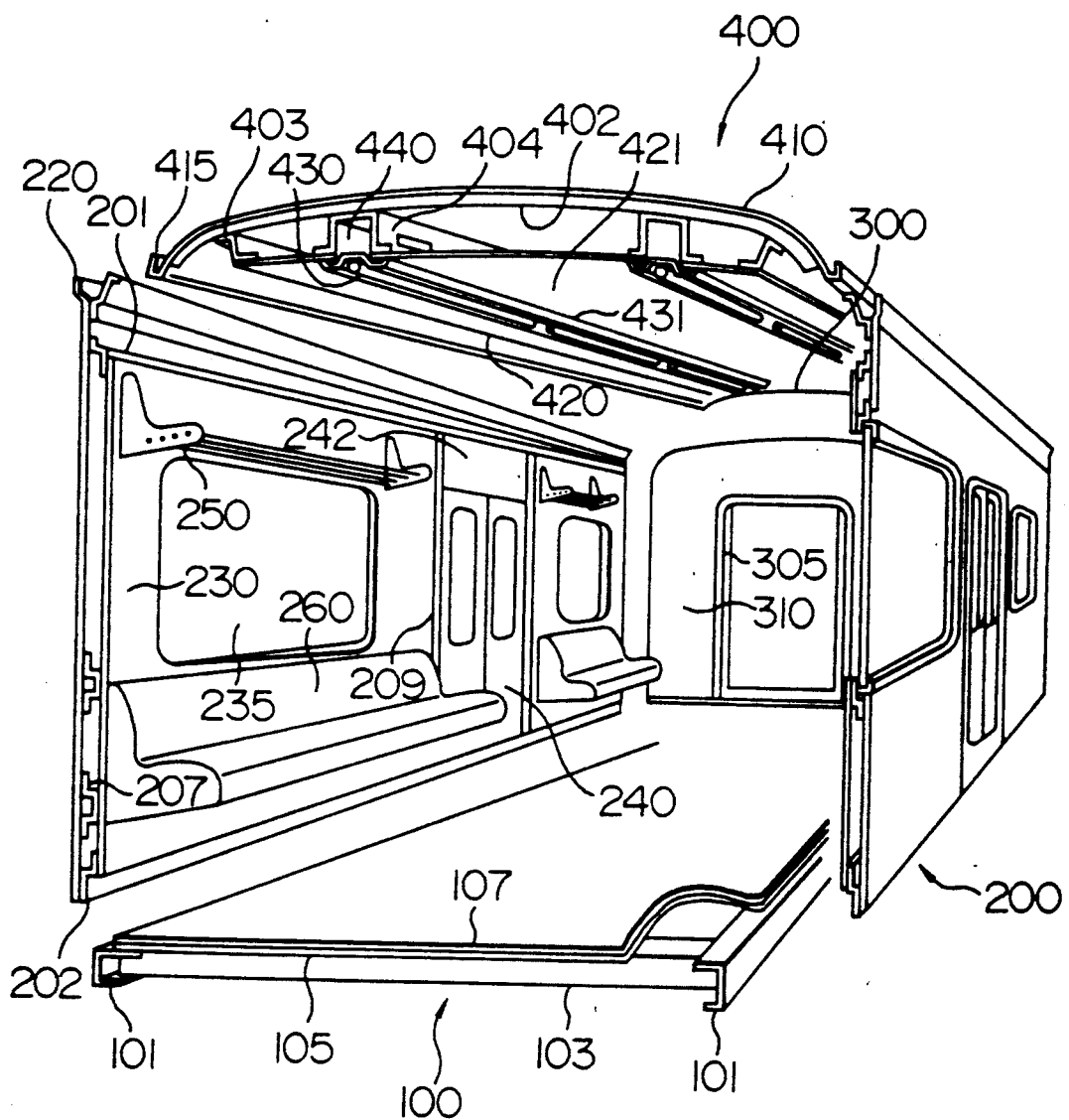
FIG. 2 is an exploded perspective view of a vehicle according to the embodiment of the present invention.

As shown in FIG. 2, a vehicle body constructed in accordance with the present invention includes a floor block 100, side blocks 200, end blocks 300, and a roof block 400. The floor block 100, the side blocks 200 and the roof block 400 have the same length as a vehicle body to be constructed. The interior components are attached to these six blocks before they are connected together to form a hexahedron.

Attached to the lower surface of the floor block 100 are air pipes, electric wiring tubes, various electric apparatuses and pneumatic apparatuses (none of which are shown). Of these components, particularly the heavy components are mounted after the assembly of the blocks.

The floor block 100 is composed of right and left longitudinal beams 101 extending in the longitudinal direction of the vehicle, a plurality of lateral beams 103 linking these longitudinal beams 101 to each other, a floor board 105 provided on the upper surfaces of these beams and including one a flat metal plate, a light-metal shape member, a honeycomb panel, or the like, a resin mat 107 provided on the upper surface of the floor board 105, etc. Provided under the floor are couplers (not shown) for connecting the vehicle to a bogie or another vehicle. The strength members namely, the longitudinal beams 101, lateral beams 103, floor board 105, etc. are joined to each other by spot welding or the like except for the mat 107. The longitudinal and lateral beams 101 and 103 are formed of stainless steel.

Each side block 200 includes a framework composed of two longitudinal beams 201, a plurality of columns 205, a plurality of side members 207, an entrance frame 209, etc., an outer plate 220 attached to the outer side of the framework, an interior plate 230 attached to the inner side of the framework, window devices 235 equipped with window panes, a door device 240, racks 250, seats 260 extending in the longitudinal direction of the vehicle, etc.

An inspection cover 242 is provided for covering a drive device for driving the door device 240 and, since the door device 240 is provided on the side block 200, the inspection cover 242 is also provided on the side block 200. The racks 250 and the seats 260 are arranged on the interior plate 230.

The back sections of the seats 260 are fixed to the above-mentioned framework. The fixation can be effected in various ways. Each seat 260 is composed of an L-shaped seat frame, a seat section serving as a cushion, and a backrest section. First, the L-shaped frame is fixed to the above-mentioned framework. For example, reverse-L-shaped hook members which are provided on the upper section of the seat frame may be engaged with holes provided on the framework, and then the lower section of the seat frame is fixed to the framework by means of bolts or the like. Alternatively, both the upper and lower sections of the seat frame may be hooked onto the framework, or else, both the upper and lower frame sections may be fixed to the framework by means of bolts or the like. Subsequently, the backrest section of the seat is attached to the frame. This attachment is effected by inserting upper hook members provided on the backrest into holes in the seat frame, and then fixing the lower section of the backrest section to the seat frame by bolts or the like. Finally, the seat section is attached to the seat frame by inserting protruding sections on the lower surface of the seat section into recesses in the seat frame.

The members 201, 202, 205, 207, 209, etc. forming the framework of each side block 200 are connected to each other by spot welding. The outer plate 220 of each side block 200 is also connected thereto by spot welding. The interior plate 230 of each side block 200 is fixed to the framework thereof by an adhesive, screws or the like. The framework and the outer plate 220 are made of stainless steel.

The interior plate 310 of each end block 300 is attached thereto after the exterior plate thereof has been connected to other associated blocks.

The roof block 400 comprises a framework composed of a plurality of arcuate lateral beams 402 and a plurality of longitudinal beams 403 and 404 linking the lateral beams 402, an exterior plate 410 fixed to the lateral beams 402, rain gutters 415, interior plates 420 and 421 joined to the longitudinal beams 403 and 404, illuminating equipment 430, air-conditioning ducts 440, etc.

The longitudinal beams 404 also serve as air conditioning ducts, which communicate with an air conditioner (not shown). Air outlets for the air conditioner are formed in the lower surfaces of the longitudinal beams 404. Reflectors of the illuminating equipment 430 serve as diffusers for the air from the air outlets.

The connection of the lateral beams 402 and the longitudinal beams 403 and 404 to form the framework and the attachment of the exterior plate 410 and the interior plates 420 and 421 to this framework are effected by the same connecting means as used with the side blocks. The lateral beams 402, the longitudinal beams 403 and 404, and the exterior plate 410 are made of stainless steel.

The six blocks, constructed as described above, are connected together after they are equipped with interior components. That is, prior to the assembly, each of the side blocks 200 is equipped with the interior plate 230, the window devices 235, the door device 240, the racks 250, the seats 260, etc. Here, the window devices 235 are substantially incapable of being opened or closed. The roof block 400 is equipped with the interior plates 420 and 421, the illuminating equipment 430, the air conditioning duct 440, etc.

When connecting the lower sections of the side blocks 200 to the floor block 100, assemblies of the longitudinal beams 202 and the outer plates 220 are attached from the exterior side to the vertical surfaces of the longitudinal beams 101 of the floor block 100. This attachment is performed using a method which allows the attaching operation to be conducted only on the exterior side. For example, it may be performed by an indirect-type spot welding, plug welding, rivets, or the like. The indirect-type spot welding allows the attaching operation to be conducted only from the exterior side. Since the floor block 100, on which the welding is effected, is firmly built, it is possible to employ the above-mentioned welding method. That is, in this type of welding, one of the electrodes is strongly pressed from the exterior side against the floor block 100, so that it is necessary for the member which constitutes the other electrode (i.e., the floor block 100) to be strong enough. Regarding an attaching method using rivets, it is possible to use rivets 500 described later.

The connection of the end blocks 300 and the floor block 100 can be effected in the same manner as described above.

Figure 1:
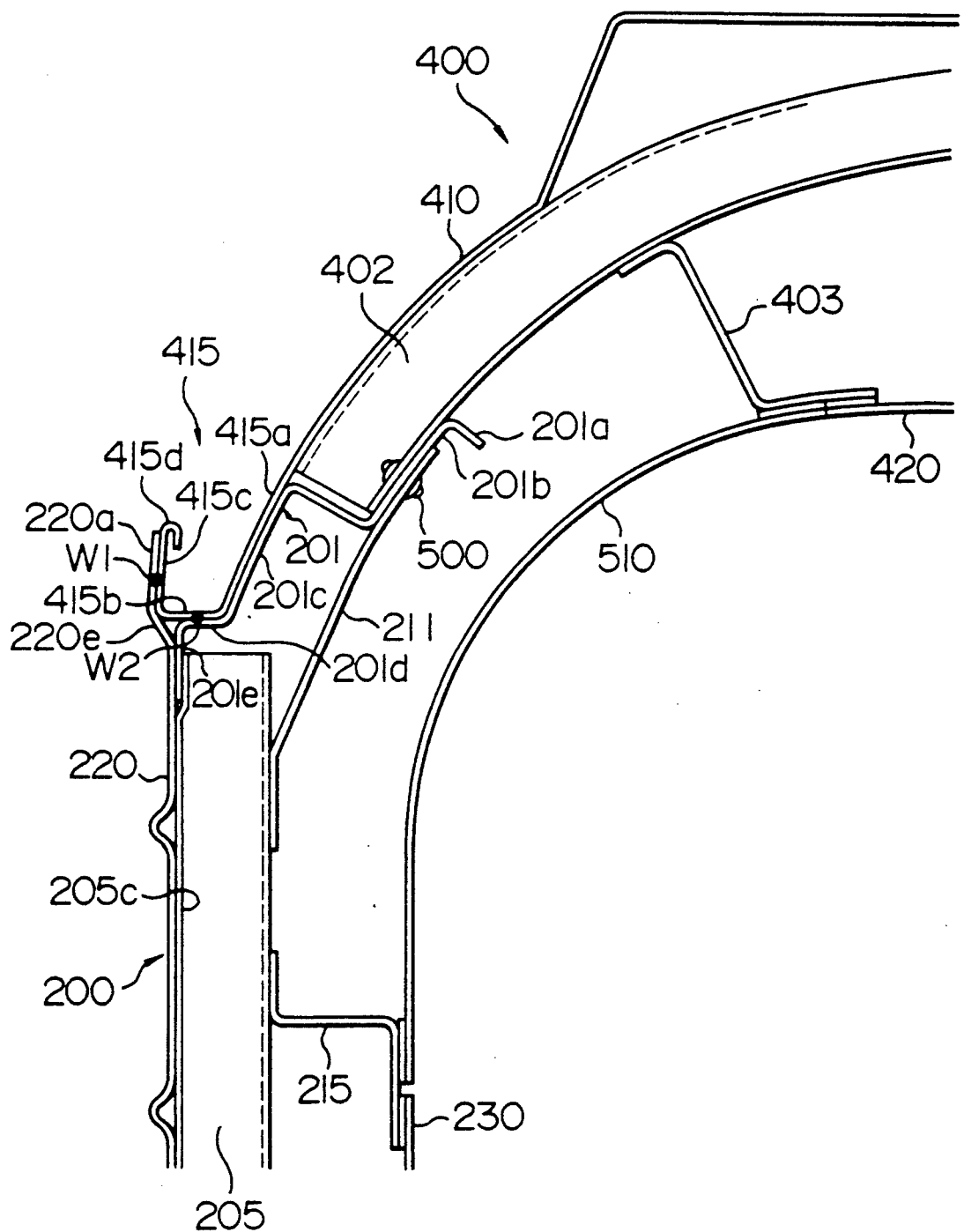
FIG. 1 is a sectional view of a joint section between a side block and a roof block of an embodiment of the present invention.

FIG. 1 shows a joint section between one of the side blocks 200 and the roof block 400. Provided at each side edge of the width of the roof block 400 is a gutter 415 which is formed by upwardly bending an end portion of the outer plate 410. A bottom section 415$b$ of each gutter 415 is substantially horizontal. Each gutter 415 further includes a vertical section 415$c$, an upper end portion 415$d$ the top end of which is bent inwardly. Each gutter 415 is situated at the upper end of each side block 200, which is substantially vertical.

The structure of the upper end portion of each side block 200 will now be described. The longitudinal beam 201 is bent in such a manner as to be in contact with the lower surfaces of the lateral beams 402, the inner vertical section 415$a$ of the gutter 415, the bottom section 415$b$ of the same, and the exterior plate 220. Each column 205 has a sectional channel-like configuration and is equipped with an end flange 205$c$, which is secured to the exterior plate 220 by spot welding. The lower end of the longitudinal beam 201 is placed between the flange 205c of each column 205 and the exterior plate 220, with these three members being connected together by spot welding.

The exterior plate 220, which is situated below the gutter 415, has an upward extension formed as an upper end section 220a which is bent in such a manner as to be in contact with the outer vertical section 415c of the gutter 415. That section of the exterior plate 220 which extends between the upper end section 220a, which is in contact with the vertical gutter section 415c, and the rest of the exterior plate 220 is formed as an oblique section which is not in contact with the bottom section 415b of the gutter 415.

Fixed to the upper interior section of each column 205 by spot welding is a joint 211 for joining the column to the roof block 400. The upper end of the joint 211 is fixed by spot welding to the lower side of the upper end section 201b of the longitudinal beam 201. The joint 211 is made of stainless steel.

An elongated mounting seat 215 is provided for the interior plate 230, with the mounting seat 215 being attached to the columns 205 by spot welding and extending in the longitudinal direction of the vehicle. The interior plate 230 is attached to the mounting seat 215 by an adhesive, screws, or the like.

The operation of connecting the side blocks 200 to the roof block 400 will now be described. After the side blocks 200 and the outer plates of the end blocks 300 have been connected to the floor block 100 and the side blocks 200 and the end blocks 300 have been connected together, the roof block 400 is lowered and placed on the side blocks 200. Then, the sections 415a, 415b and 415c of the gutter 415 are brought into contact with the longitudinal beams 201c and 201d of the side blocks 200 and the outer plates 220. The upper end sections 220a of the outer plates 220 are inclined toward the gutters 415. However, since there is a rounded portion between the bottom section 415b and the vertical section 415c of each gutter 415, the upper end portions 220a of the vertical exterior plates 220 can be diverged to allow the gutters 415 to be fitted into the side blocks 200. Since there is a inclined section 220e between the upper section 220a and the rest of each vertical exterior plate 220, the upper end section 220a can be inclined and then easily restored to a position in which the upper end section 220a is in contact with the vertical section 415c of each gutter 415.

The side blocks 200 and the roof block 400 are connected with each other at the following three positions:

The upper end section 220a of each exterior plate 220 is connected to the vertical section 415c of each gutter 415 by spot welding, as indicated at W1. Since the width of the gutter 415 is so sized as to allow the insertion of one of welding electrodes used, welding can be conducted across the upper end section 220a of the exterior plate 220 and the vertical section 415c of the gutter 415.

Further, the bottom section 415b of each gutter 415 and the flat section 201d of each longitudinal beam 201 is welded to each other, as indicated at W2, by a welding method which can only be conducted from the outside. Examples of the welding methods which may be adopted include arc spot welding, series spot welding, in which two electrodes arranged in parallel are used, and plug welding. In any case, the electrodes are set on the outside. Here, arc spot welding and series spot welding are preferable. In particular, series spot welding is most preferable in respect of vehicle appearance after welding.

The upper ends of the joints 211, the upper sections 201b of the longitudinal beams 201, and the lateral beams 402 are connected together from the inside by using rivets 500. Each rivet 500 is composed, for example, of a cylinder, a pin extending therethrough and a clamping member. The cylinder is inserted into holes provided in the two plates to be connected together. The clamping member is set on the side of the operator, and the pin is pulled using the clamping member as a guide to enlarge the tip end of the cylinder, thereby fixing the pin to the clamping member. In this manner, the two plates are firmly connected to each other. This rivet 500 is well known per se.

After the connection of these components has thus been effected, an interior plate 510 is attached to the mounting seat 215 and the longitudinal beam 403. The interior plate 510 is attached by means of an adhesive, screws, or the like. Further, the gap between the upper end section 220a of each exterior plate 220 and the vertical section 415c of each gutter 415 is sealed with a sealing material. The upper end portion 415d of the gutter 415 may be bent outwardly so as to cover the gap between the vertical section 415c and the upper end section 220a, thereby facilitating the sealing.

As described above, the side blocks 200 and the roof block 400 are connected to each other on the side of the exterior plates 220 and 410. Further, the inner sides of the frameworks of the blocks are also connected to each other. Since the attachment is thus effected both from the exterior side and the interior side, a firm connection can be realized.

Of the two types of connecting means used for the sections of the gutters 415, spot welding is used in connecting the outer vertical sections 415c of the gutters 415 to the upper end sections 220a of the exterior plates 220. Although the spot welding entails discoloration, there is an established method available which helps to eliminate such discoloration and which can be applied relatively easily. Therefore, although the sections where the exterior plates 220 and the vertical section of the gutters 415 are connected to each other by spot welding are visible from the outside, the spot does not lead to any deterioration in the outer appearance of the vehicle. The sections where the welding of the bottom sections 415b is effected are not visible from the outside, so that there is no deterioration in outer appearance after the welding. Accordingly, it is possible to produce a vehicle having a satisfactory outer appearance even though the welding is performed on the outside. Further, it should be noted that welding is more advantageous than rivets in that welding is less expensive and requires no waterproofing.

Further, since spot welding is employed for connecting the outer vertical section 415c of each gutter 415 to the upper end section 220a of each exterior plate 220, the welding operation is relatively easy and can be conducted at short intervals along the length of the vehicle. As a result, a firm connection can be obtained in these sections. Accordingly, the welding interval for the bottom sections 415b can be made large, thus facilitating the welding. Therefore, a substantial reduction in the production cost can be attained on the whole. Where a sufficiently firm connection can be obtained by the spot welding W1 only, the welding of the bottom sections 415b can be omitted.

As described above, in this embodiment, end portions of the exterior plate 410 of the roof block 400 are bent so as to form gutters 415 having vertical sections 415c, on which the outer plates 220 of the side blocks are superimposed. Due to this arrangement, it is only necessary for the sealing material for bonding the roof block 400 to each side block 200 to be applied to a single position, which is not the case with the examples shown in FIGS. 3, 5 and 6.

The weldings W1 and W2 are conducted outside the vehicle. By "outside" it is meant to say that all the instruments needed for the connecting operation (for example, the welding electrodes) are placed exteriorly the vehicle. Accordingly, the interior plates 230 and 420 are not affected by sputters. The connection on the inner side is effected by using the rivets 500, which means that the interior plates 230 and 420 are not affected by sputters. The connection using the rivets 500 can be conducted solely inside the vehicle. In other words, all the instruments needed for the connecting operation (for example, a device for pulling pins) may be set in the interior of the vehicle. In this manner, each connecting operation can be conducted either only exteriorly of or only interiorly of the vehicle, so that the connection can be effected even with the window devices 235 and the interior plates 230 and 420 attached to the blocks beforehand.

Since the longitudinal beams 201 fixed to the side blocks 200 are bent, there is no possibility that the side blocks 200 are bent while they are independently conveyed, and thus can be easily handled. Further, the vertical sections 415c and 220a serve as positioning members when the roof block 400 is lowered toward the side blocks 200.

Figure 3:
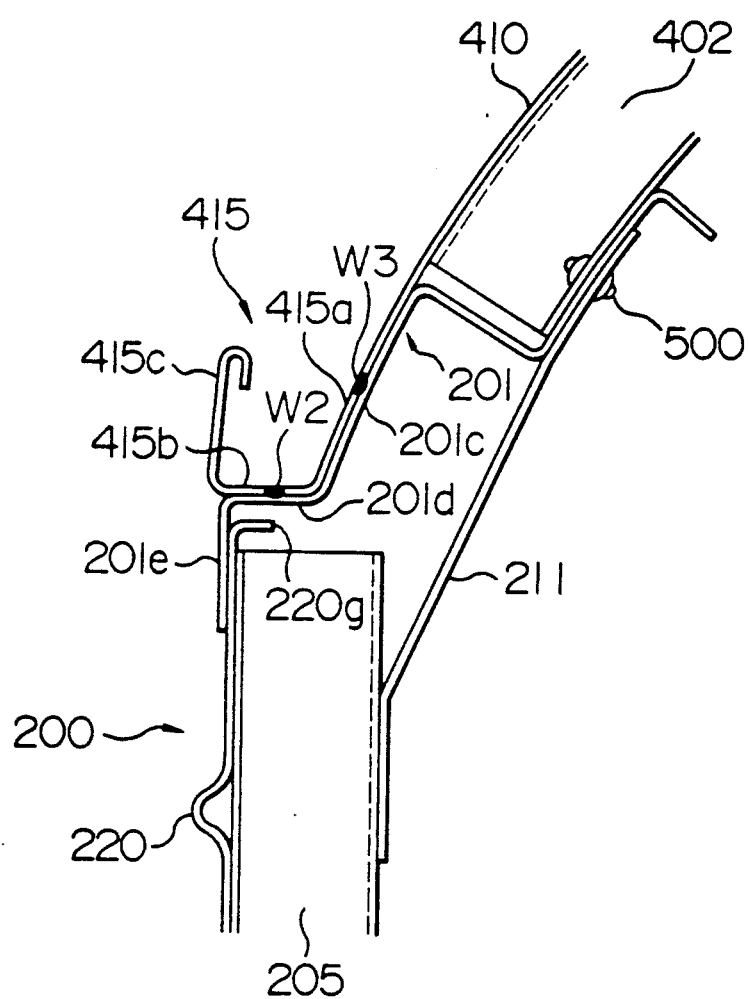
FIG. 3 is a sectional view of a joint section between a side block and a roof block of another embodiment of the present invention.

If the connection at only the bottom sections 415b of the gutters 415 is not sufficient, or if it is desired to omit the welding of the bottom sections 415b, the upper end of the inner vertical section 415a of each gutter 415 (a border section between the gutter 415 and the roof section) is welded to the vertical section 201c of each longitudinal beam 201 to form a welding W3, by the same welding method as used above. The position of this welding W3 is determined at a level as low as possible. This section is hardly visible from the outside. Moreover, in the case of a railroad car, an insulating paint or an insulating sheet is applied thereto, so that the welding does not affect the outer appearance of the vehicle. The welding W3 is shown in FIG. 3.

Rivets 500 may be used as the means for connecting the bottom section 415b of each gutter 415 to the associated longitudinal beam 201d. In that case, a sufficient waterproof sealing has to be provided.

The upper sections 220a of the exterior plates 220 in contact with the vertical sections 415c of the gutters 415 may be prepared as separate members independent of the outer plates. In that case, these separate members are fixed by spot welding to those sections of the exterior plates 220 registered with the columns 205 prior to the connection of the roof block 400 and the side blocks 200. The vehicle body assembling operation described above is also applicable to vehicle bodies having no gutters.

Other embodiments of the means for connecting the side blocks 200 to the roof block 400 will now be described with reference to FIGS. 3 to 6. In these FIGS. 3–6, for the sake of clarity, the interior members 230, 420 and 510 are not shown. A sealing material for waterproofing is applied to the joint sections between the plate sections forming the gutters 415 and the sections around the same. However, a description of this arrangement will be omitted here.

In the embodiment shown in FIG. 3, the lower end section 201e of each longitudinal beam 201 is situated outside the exterior plate 220. The lower end section 201e of each longitudinal beam 201 is connected to the exterior plate 220 by spot welding. The side block 200 and the roof block 400 are welded to each other at positions indicated at W2 and W3.

Figure 4:
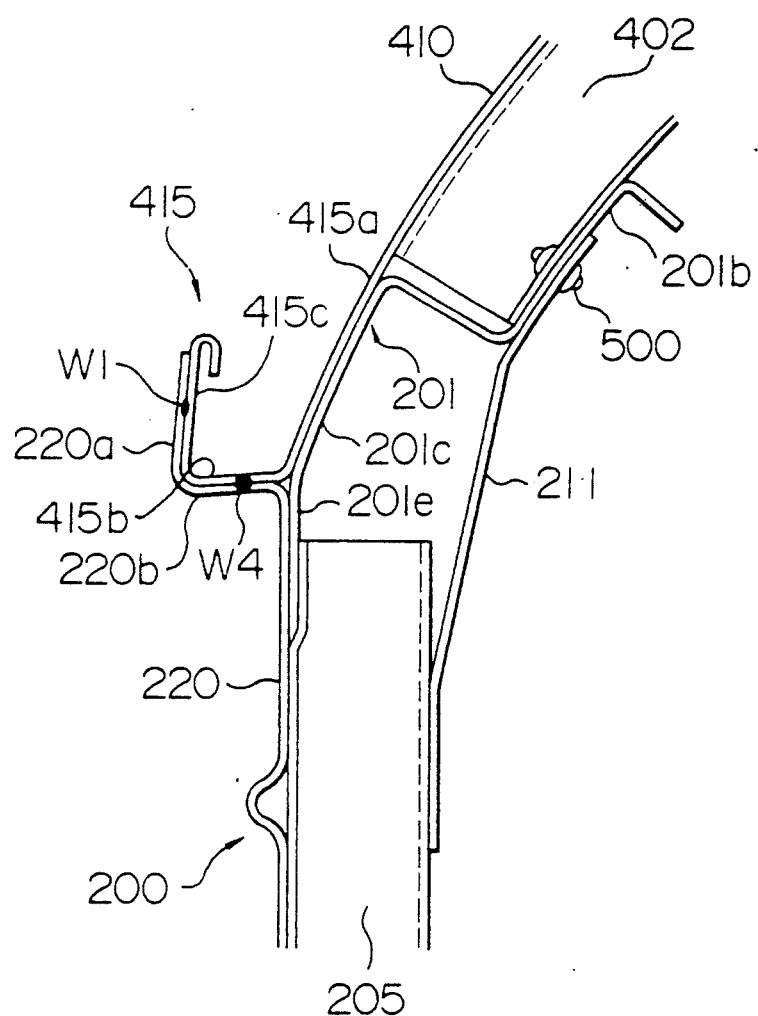
FIG. 4 is a sectional view of a joint section between a side block and a roof block of still another embodiment of the present invention.

In the embodiment shown in FIG. 4, the gutter 415 is situated outside the columns 205. The upper end sections 220b and 220a of each exterior plate 220 are in contact with the bottom section 415b and the vertical section 415c of each gutter 415. The vertical section 415c and the bottom section 415b of each gutter 415 are connected to the associated exterior plate 220 by spot welding as indicated at W1 and W4. This arrangement helps to reduce the production costs. Unlike the beam 201 of the embodiment of FIG. 3, the beam 201 in this embodiment has no section 201d. The lower end 201e is spot-welded to the exterior plate 220. The upper end sections 220b and 220a may consist of a separate member spot-welded to the outer plate 220.

Figure 5:
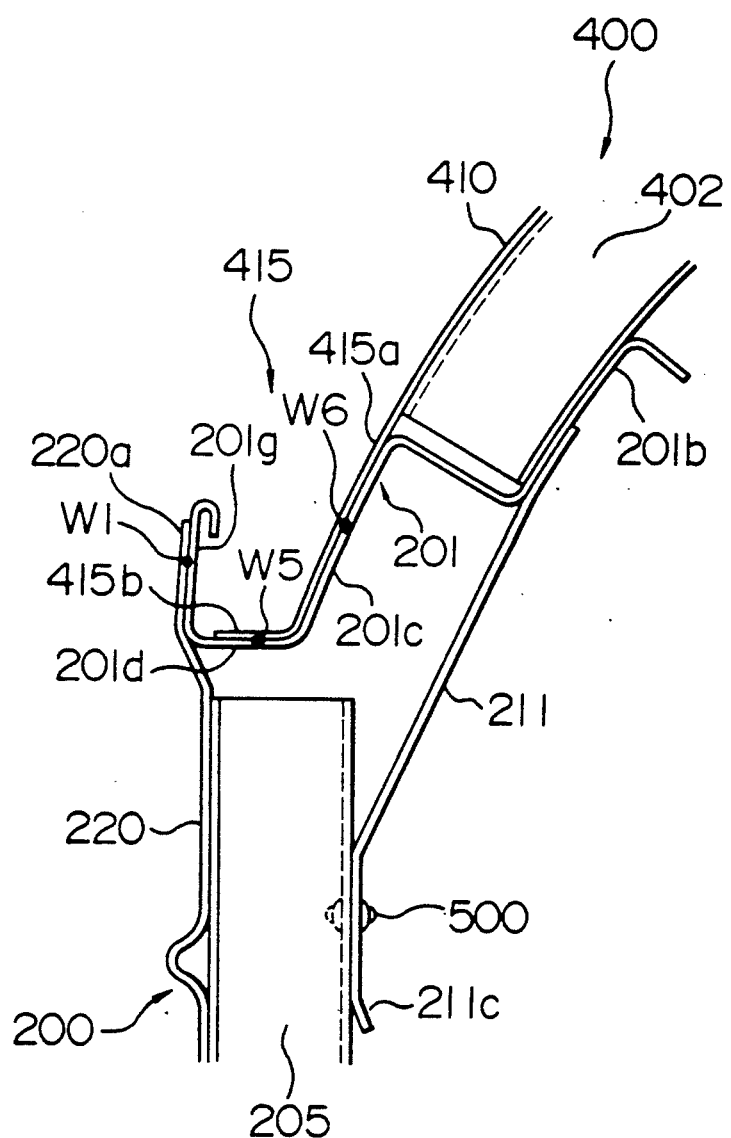
FIG. 5 is a sectional view of a joint section between a side block and a roof block of a further embodiment of the present invention.

In the embodiment of FIG. 5, the outer plate 410 has no vertical sections 415c forming the gutters 415. Instead, the outer side edge portion of each longitudinal beam 201 is raised to form a vertical section 201g to form the gutter 415. The longitudinal beam 201 has a bottom section 201d and an inner vertical section 201c which are spot-welded to the outer plate 410 as indicated at W5 and W6. The upper section 201b of each longitudinal beam 201 and the upper end portion of each joint 211 are welded to the lateral beams 402. The longitudinal beams 201 constitute a part of the outer plate of the roof block 400. This arrangement facilitates the connection of the side blocks 200 and the roof block 400 at the positions of the gutters 415. The bottom sections 415b may be omitted.

In embodiment of FIG. 5, the lower section of each joint 211 is connected to the column 205 by rivets 500 after the side blocks 200 and the roof block 400 have been assembled together. To facilitate the lowering of the roof block 400, the lower end portion 211c of each joint 211 is bent inwardly. The connection of each side block 200 and the roof block 400 is effected by welding as indicated at W1 and the rivets 500.

Further, as in the case of the embodiments of FIGS. 1 through 4, it is possible for the joints 211 to be secured to the side blocks 200 beforehand and connected to the lateral beams 402 by rivets 500 after the assembling of the side blocks 200 and the roof block 400.

Figure 6:
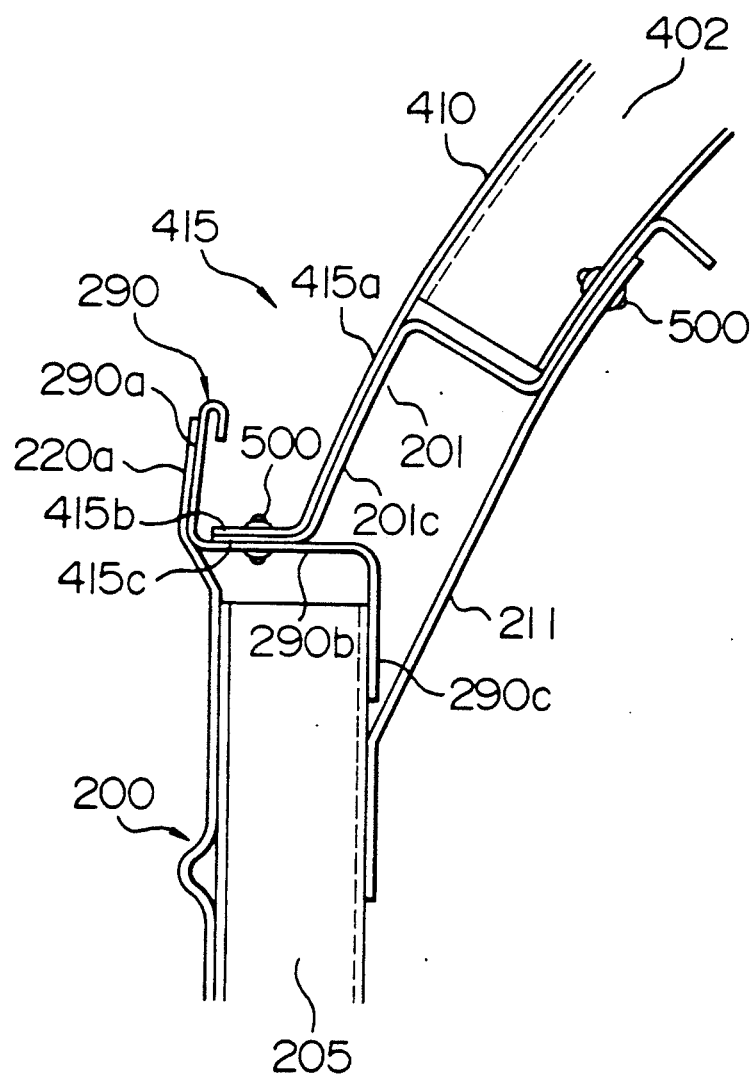
FIG. 6 is a sectional view of a joint section between a side block and a roof block of a still further embodiment of the present invention.

The embodiment of FIG. 6 includes longitudinal beams 290 which are in contact with the inner sides of the upper end sections 220a of the exterior plates 220 of the side blocks 200 and with the interior sides of the columns 205. The section of each longitudinal beam 290 between the exterior plate 220 and the columns 205 is horizontal. The longitudinal beams 201, which have no sections 201e, are spot-welded to the roof block 400. The side blocks 200, equipped with the longitudinal beams 290, and the roof block 400, equipped with the longitudinal beams 201, are assembled with each other. By placing an edge portion of the roof block 400 on the horizontal section of each longitudinal beam 290, a gutter 415 is formed. The horizontal sections of the longitudinal beams 290 and the edge portions of the roof block 400 are connected together by rivets 500.

Figure 7:
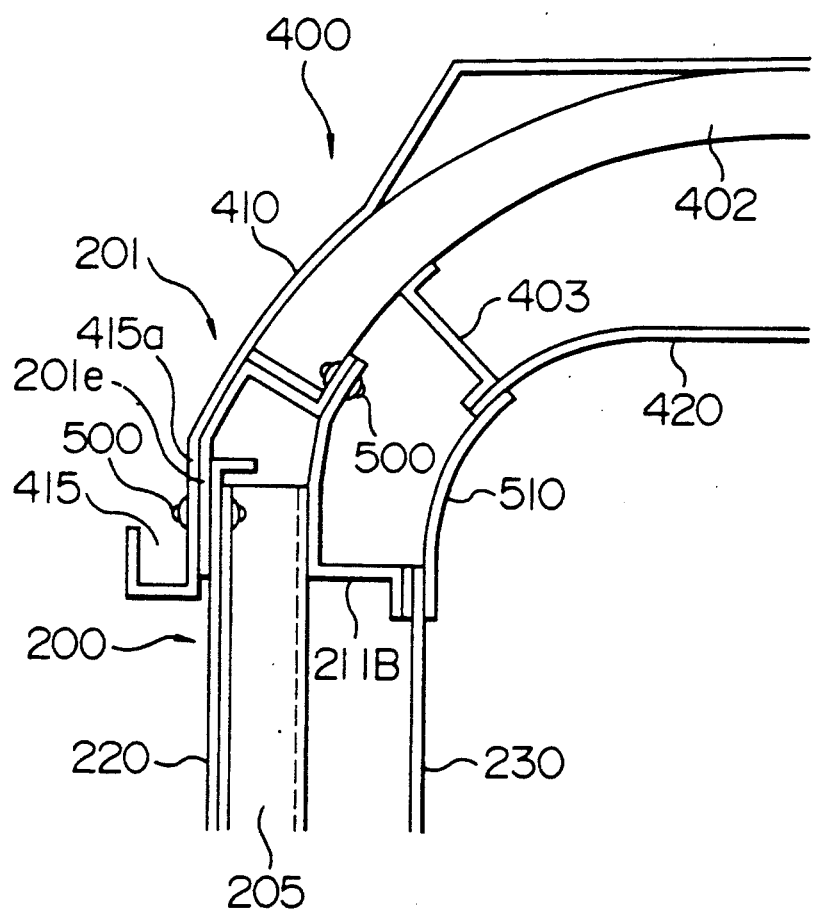
FIG. 7 is a sectional view of a joint section between a side block and a roof block of a still further embodiment of the present invention.

In the embodiment of FIG. 7, the lower ends 201e of the longitudinal beams 201 are situated outside the outer plates 220, and the gutters 415 are situated still more outwardly. The gutters 415 are formed solely by the exterior plate 410. The inner vertical sections 415a of the gutters 415 overlap the lower edge portions 201e of the longitudinal beams 201. The outer vertical sections 415a of the gutters 415 are connected to the blocks 200 from the outside by means of rivets 500. Further, this embodiment employs joints 211B which have the function of the joints 211 and that of the mounting seats 215.

In accordance with the present invention, the side blocks 200 and the roof block 400 are connected together at the gutter sections provided at the upper sections of the side blocks 200, so that the connecting operation can be conducted solely outside the vehicle and after the interior finish work has been completed. Further, the connecting operation can be easily conducted without impairing the outer appearance of the vehicle even though the connecting operation is conducted exteriorly of the vehicle.

What is claimed is:

1. A vehicle comprising: a pair of side blocks forming sides of the vehicle, each of said side blocks having a post member, an exterior plate connected to an outside surface of said post member and an interior plate spaced inwardly from and connected to said post member;
   a roof block forming a roof of the vehicle between said side blocks and having a lateral beam, an exterior plate connected to an outside surface of said lateral beam and an interior plate spaced inwardly from and connected to said lateral beam;
   outer connecting means connecting an end portion of the exterior plate of said roof block to an end portion of the exterior plate of each of said side blocks between longitudinal ends of the vehicle;
   inner connecting means connecting an inside surface of an end portion of said lateral beam of said roof block to an inside surface of an end portion of the post member of each of said side blocks; and
   a third interior plate extending between the interior plate of said roof block and the interior plate of each of said side blocks.

2. A method of producing a vehicle, the method comprising the steps of:
   producing a pair of side blocks each having a post member, an exterior plate connected to an outside surface of said post member, and an interior plate spaced inwardly from said connected to said post member;
   producing a roof block having a lateral beam, an exterior plate connected to an outside surface of said lateral beam and an interior plate spaced inwardly from and connected to said lateral beam;
   assembling the thus produced roof block and side blocks;
   connecting together, after the step of assembling, an end portion of the exterior plate of said roof block and an end portion of the exterior plate of each of said side blocks between longitudinal ends of the vehicle;
   connecting together, after the step of assembling, an inside surface of an end portion of the lateral beam of said roof block and an inside surface of an end portion of the post member of each of said side blocks by connecting operations conducted interiorly of the vehicle; and
   providing, after the step of connecting said inside surfaces of said lateral beam and said post, a third interior plate between the interior plate of said roof block and the interior plate of each of said side blocks.

3. A vehicle comprising a pair of side blocks forming sides of the vehicle, each of a roof block forming a roof of the vehicle between said side blocks, wherein:
   each of said side blocks comprises an exterior plate, a framework, an interior plate and a longitudinal beam disposed at the upper end of the side block and continuously extending in a longitudinal direction of the vehicle;
   said roof block including an exterior plate, a framework and an interior plate, end portions of said exterior plate of said roof block form bottom sections and outer and inner vertical sections of gutters of the vehicle;
   an upper end section of the exterior plate of each of said side blocks overlaps the outer vehicle section of one of said gutters and is connected thereto by spot welding;
   each of said longitudinal beams is connected to one of the bottom section of one of said gutters and a boundary portion between a roof portion of said roof block and the gutter by spot welding;
   said spot welding constituting connecting means which enable connecting operations for forming said connecting means to be conducted solely from an exterior side of the vehicle;
   at least one of the upper end of a joint connected to the upper end of an inner side of the framework of each side block and an upper end of each longitudinal beam is connected to said framework of said roof block by fastening means which enables connecting operations to be conducted solely from an inner side of the vehicle, the upper end of said joint being connected to the upper end of the longitudinal beam; and
   said fastening means are disposed between the interior plate of each side block and an interior plate of said roof block, a third internal plate being arranged between said two interior plates.

4. A vehicle comprising a pair of side blocks forming sides of the vehicle, each of a roof block forming a roof of the vehicle between said side blocks, wherein:
   each of said side blocks comprises an exterior plate, a framework, an interior plate and a longitudinal beam disposed at the upper end of the side block and continuously extending in a longitudinal direction of the vehicle;
   said roof block including an exterior plate, a framework and an interior plate, end portions of said exterior plate of said roof block form bottom sections and outer and inner vertical sections of gutters of the vehicle;
   the exterior plate of each side block has an upper end section protruding outwardly of the vehicle and in a substantially horizontal direction;
   the bottom section of each gutter is connected to the upper end section of said side block exterior by spot welding;
   at least one of the upper end of a joint connected to the upper end of an inner side of the framework of each side block and an upper end of each longitudinal beam is connected to the framework of said roof block by fastening means which enables connecting operations to be conducted solely from an inner side of the operations to be conducted solely from an inner side of the vehicle, the upper end of said joint being connected to the upper end of the longitudinal beam; and said fastening means are disposed between the interior plate of each side block and an interior plate of said roof block, a third internal plate being arranged between said two interior plates.

5. A vehicle according to claim 4, wherein said upper end section of said side block exterior plate has an end extremity extending upwardly to overlap an outer vertical section of an associated gutter and is connected thereto by spot welding which constitutes said connecting means.

6. A method of producing a vehicle, the method comprising the steps of:

producing a roof block including an external plate forming a roof of the vehicle, an interior plate and a framework between said external and internal plates, said roof block external plate having end portions shaped to form at least a part of gutters of the vehicle, each gutter extending in a longitudinal direction of the vehicle and having a bottom and outer and inner vertical sections;

producing side blocks each including an exterior plate forming a side of the vehicle, an interior plate, a framework disposed therebetween and a longitudinal beam connected to an upper end section of said side block exterior plate and extending in the longitudinal direction of the vehicle;

assembling the thus produced side blocks and roof block such that an upper end portion of each side block exterior plate extends upwardly in overlapping relationship with the outer vertical section of one of said gutters and such that said side block longitudinal beams and those portions of said roof block which form said gutters are overlapped with each other;

connecting together, after said assembling step, the thus overlapped side block longitudinal beams and said roof block portions, by spot welding which enables connecting operations to be conducted solely from an exterior side of the vehicle;

connecting together, after said assembly step, upper sections of the frameworks of said side blocks and the framework of said roof block by connecting operations conducted interiorly of the vehicle; and providing, after said step of connecting the upper sections of said side block frameworks and said roof block frame work, a third interior plate between the interior plate of each side block and the roof block interior plate.

* * * * *